United States Patent
McKinley et al.

(10) Patent No.: US 6,974,261 B1
(45) Date of Patent: Dec. 13, 2005

(54) OPTICAL BONDING STRUCTURE

(75) Inventors: Larry E. McKinley, San Diego, CA (US); Blair R. Dobbie, Roanoke, VA (US); Charles Dale Willey, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 35 days.

(21) Appl. No.: 10/743,983

(22) Filed: Dec. 22, 2003

(51) Int. Cl.$^7$ .................................................. G02B 6/36
(52) U.S. Cl. ............................................ 385/88; 385/53
(58) Field of Search ................................ 385/88, 89, 90, 385/91, 92, 93, 94, 53; 250/227.14

(56) References Cited

U.S. PATENT DOCUMENTS

| | | | |
|---|---|---|---|
| 4,324,452 A | 4/1982 | Noguchi et al. | |
| 5,392,373 A * | 2/1995 | Essert | 385/92 |
| 5,602,952 A | 2/1997 | Rashleigh et al. | |
| 5,617,501 A | 4/1997 | Miller et al. | |
| 6,733,190 B2 * | 5/2004 | Kuhara et al. | 385/94 |

* cited by examiner

*Primary Examiner*—Akm Enayet Ullah
*Assistant Examiner*—Jennifer Doan
(74) *Attorney, Agent, or Firm*—RatnerPrestia

(57) ABSTRACT

A method of mounting a fiber optic unit to a photosensor. The photosensor is mounted to a first carrier. A first end of the fiber optic unit is bonded to the photosensor to create a joint between the fiber optic unit and the photosensor. A second end of the fiber optic unit is mounted to a second carrier. The joint between the fiber optic unit and the photosensor is compressed. This compressing step strengthens the bond between the fiber optic unit and the photosensor.

19 Claims, 3 Drawing Sheets

OPTICAL BONDING STRUCTURE

TECHNICAL FIELD

The present invention relates generally to devices used to physically attach a fiber optic unit to a photosensor and, more particularly to an apparatus and a method of bonding a fiber optic unit to a photosensor which will withstand significant environmental abuse.

BACKGROUND OF THE INVENTION

It is frequently necessary to join a fiber optic unit to a photosensor which converts images into electrical signals. Such connections can be used, for example, with a camera lens system or with a night vision imaging system. Numerous methods and devices are known in the art for coupling a fiber optic unit to a photosensor. Historical techniques for bonding optical components together at surfaces through which the ray-path of the light must transmit have emphasized the optical requirements: clarity, joint thinness, material index of refraction, and ease of application. Various kinds of known cements can be used to bond a fiber optic unit to a photosensor. Once the bonding has been performed, means are required to provide and maintain the structural integrity of the bond between the fiber optic unit and the photosensor. Means which have been used to provide structural integrity are precision housings and a cemented-in-place optical sub assembly.

However, most devices are not expected to withstand significant physical abuse such as high temperature, low temperature, mechanical shock, or vibration. Often, when any of these kinds of abuse are sufficiently severe, there is a destruction of the bond between the fiber optic unit and the photosensor resulting in a release of the fiber optic unit from the photosensor. When the bond releases, the optical components separate and the ray-path quality suffers or is destroyed. One device which has been used to prevent vibration from being transmitted to optical components in the system is shown in U.S. Pat. No. 4,324,452 to Noguchi et al.

To overcome the shortcomings of the prior art, a new device and method is provided to prevent environmental abuse such as extreme vibration from destroying and breaking the bond between a fiber optic unit and a photosensor.

SUMMARY OF THE INVENTION

The present invention provides a method of mounting a fiber optic unit to a photosensor. The photosensor is mounted to a first carrier. A first end of the fiber optic unit is bonded to the photosensor to create a joint between the fiber optic unit and the photosensor. A second end of the fiber optic unit is mounted to a second carrier. The joint between the fiber optic unit and the photosensor is compressed. This compressing step strengthens the bond between the fiber optic unit and the photosensor.

According to another aspect of the invention, the invention provides a device for mounting a fiber optic unit to a photosensor. The system uses a photosensor that is mounted to a first carrier. A fiber optic unit is coupled to the photosensor. When the fiber optic unit is coupled to the photosensor, it creates a joint between the photosensor and the fiber optic unit. A force applying means is coupled to the photosensor and the fiber optic unit. The force applying means applies a compression force to the joint between the photosensor and the fiber optic unit.

It is to be understood that both the forgoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawings are not to scale. On the contrary, the dimensions of the various features are arbitrarily expanded or reduced for clarity. Included in the drawings are the following features.

DETAILED DESCRIPTION OF THE INVENTION

Figure 1:
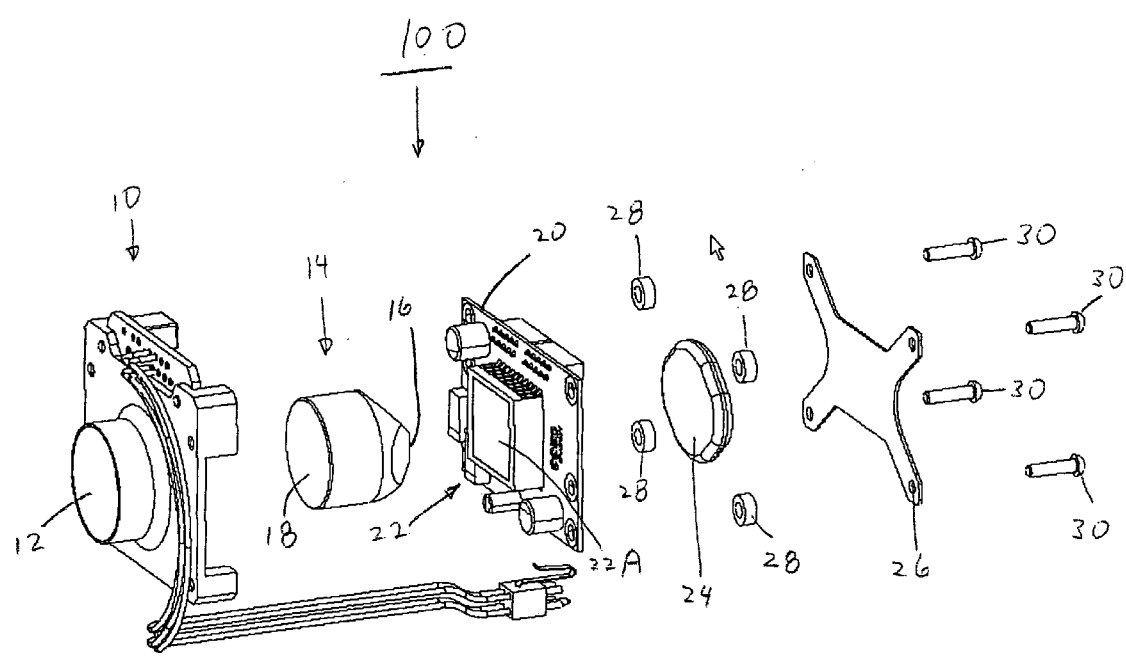
FIG. 1 is an exploded view of the components that comprise the device according to one exemplary embodiment of the present invention.

Varies aspects of the invention will now be described with reference to the Figures. It would be appreciated that this invention is not limited in spirit or scope to the embodiments selected for illustration in the Figures. It would also be appreciated that the embodiments shown in the Figures are not rendered to any particular scale or proportion.

Referring generally to the Figures, in which like reference numbers refer to like elements throughout, a device 100 is provided for mounting a fiber optic unit 14 to a photosensor 22. The photosensor 22 is mounted to a first carrier, or circuit board, 20. The fiber optic unit 14 is mounted to a second carrier 10. The fiber optic unit 14 is also coupled to the photosensor 22 to create a joint between the photosensor and the fiber optic unit. A force applying means 24, 26, 28, 30 is coupled to the photosensor and to the fiber optic unit to apply a compression force to the joint between the photosensor and the fiber optic unit. The force applying means strengthens the bond between the fiber optic unit and the photosensor.

In use, the photosensor 22 is mounted to a first carrier, or circuit board, 20. A first end 16 of the fiber optic unit 14 is bonded to the photosensor 22 to create a joint between the fiber optic unit and the photosensor. A second end 18 of the fiber optic unit is mounted to a second carrier 10. The joint between the fiber optic unit and the photosensor is compressed to strengthen the bond between the fiber optic unit and the photosensor.

FIG. 1 shows a perspective exploded view of an exemplary embodiment of the device 100 according to the present invention. As shown in FIG. 1, the device 100 includes a fiber optic unit 14. In an exemplary embodiment, the fiber optic unit 14 may be made of glass with surfaces that are highly polished. In an alternative embodiment, it may be an image carrying fiber optic cable. The device 100 also includes a photosensor 22. The photosensor 22 receives an image on its front face 22A and transmits the image to its rear face (not shown). When the image is transmitted to the rear face of the photosensor 22, it is converted into electrical energy and signals.

Photosensor 22 is mounted onto a circuit board or first carrier 20. In an exemplary embodiment, photosensor 22 is soldered onto circuit board 20. In an alternative embodiment, it may be mounted by snapping it into place. The circuit board includes circuit components which may be used to transmit the electrical signals which have been converted by the photosensor 22. The device 100 also includes a second carrier 10 which holds a tube 12. Second carrier 10 may be made of metal or other sturdy material. A first end 16 of the fiber optic unit 14 is bonded to the front surface 22A of photosensor 22. A second end 18 of fiber optic unit 14 is mounted onto carrier 10 by inserting it into tube 12. An epoxy cement may be used to bond first end 16 of fiber optic unit 14 to the front face 22A of photosensor 22. An epoxy cement may also used to bond fiber optic unit 14 to the tube 12. In an alternative embodiment a different kind of bonding may be used.

Fiber optic unit 14 is bonded to carrier 10 and to photosensor 22 in such a way that the optical axis of the fiber optic unit 14 is aligned with the optical axis of photosensor 22. In operation, the light from an image impinges upon side 18 of fiber optic unit 14 and is transmitted along the optical axis of fiber optic unit 14 to the optical axis of photosensor 22. Therefore, it is important to maintain the optical axis of the units aligned with each other.

Figure 2:
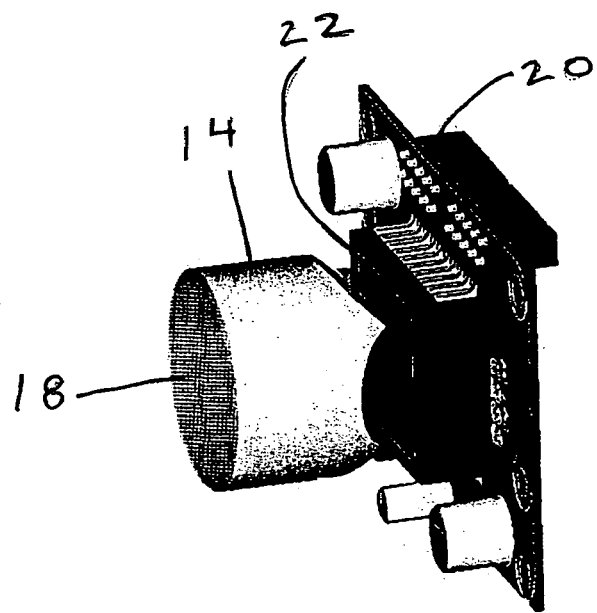
FIG. 2 is a perspective view of the initial positioning of some of the components of the device illustrated in FIG. 1.

The initial positioning of fiber optic unit 14 against photosensor 22 is shown in FIG. 2. When fiber optic unit 14 is bonded to photosensor 22, a joint is created between the fiber optic unit and the photosensor. The bonded joint employs conventional direct cementing materials to bond the two fragile components: fiber optic unit 14 which is made of optical glass and the photosensor 22. The joint is initially held with a thixotropic optical fluid or gel, or a hardening optical adhesive. The fiber optic unit may be bonded to the photosensor using a cement that is ultraviolet triggered. Alternatively, a two-part epoxy may be used. In yet another alternative embodiment, a cement that allows liquidity at the time of assembly and which sets up later may be used. Accordingly, an ultraviolet cured material may be used; or a silicon based material may be used. Even after the bonding material has cured, the bond between fiber optic unit 14 and photosensor 22 is an extremely fragile subassembly.

Figure 3:
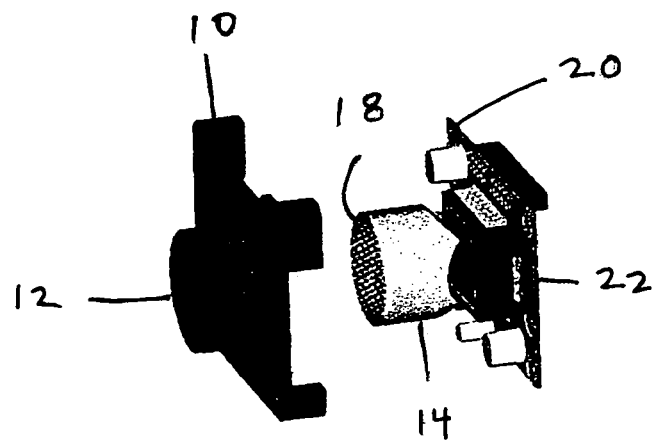
FIG. 3 is a partially exploded perspective view of the positioning of additional components used in the system illustrated in FIG. 1.
Figure 4:
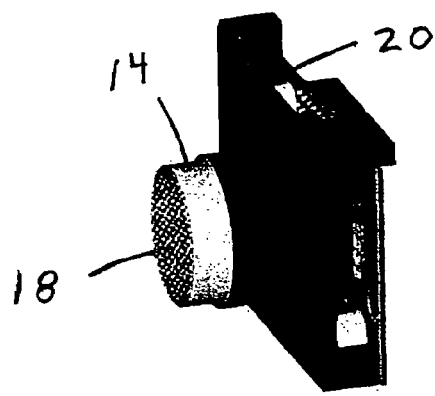
FIG. 4 is a perspective view of some of the components of the system illustrated in FIG. 1 shown in a bonded position.

In the next step, the fiber optic unit 14 is bonded to tube 12 in carrier 10. FIG. 3 shows the relative positions of the carrier 10 and the bonded fiber optic unit-photosensor combination before the fiber optic unit is bonded to the carrier 10. Fiber optic unit 14 is bonded to carrier 10 so that end 18 of the fiber optic unit protrudes beyond the end of tube 12 as shown in FIG. 4. Before the fiber optic unit is inserted into tube 12, the interior of tube 12 and the exterior of fiber optic unit 14 are pre-coated with an uncured adhesive. The adhesive become rigid upon curing. After the two units 12 and 14 are mounted to each other, mounting holes (not shown) in the four corners of the carrier 10 and the four corners of the circuit board 20 are aligned and screws 30 are temporarily used to hold the two units together until the adhesive sets up; that is, until the cement hardens and becomes rigid at its full strength. The bond between fiber optic unit 14 and tube 12 is not an optical bond. It is a structural bond between carrier 10, tube 12, and fiber optic unit 14.

Figure 5:
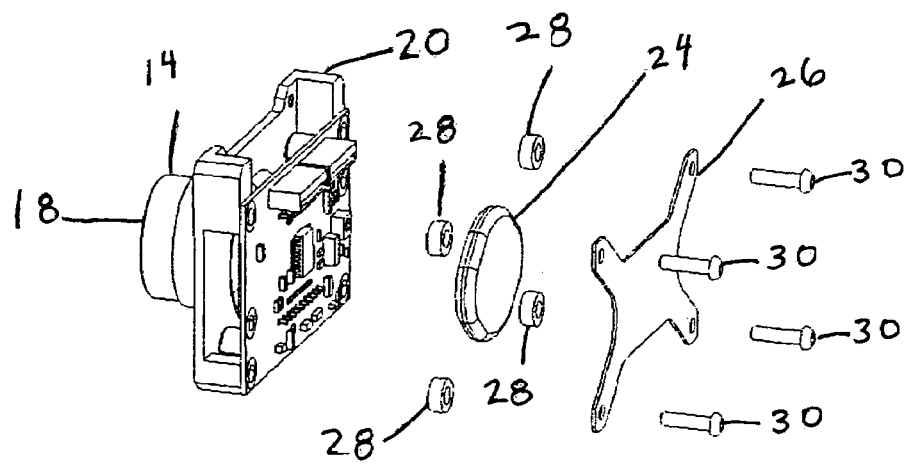
FIG. 5 is a rearward exploded perspective view of some of the components of the device illustrated in FIG. 1.

After the cement hardens and there is a structural bond between carriers 10, 12 and fiber optic unit 14, screws 30 are removed. Then an RTV (room temperature vulcanizing) paste may be applied to the back of circuit board 20 and to the circuit elements that are mounted on the back of circuit board 20 as shown in FIGS. 1 and 5. The RTV paste is part of a force applying means and forms a flexible backing or pillow as described below. In an exemplary embodiment, RTV pillow 24 may be a silicon paste. In an alternative embodiment, it may be any material which is a paste-like substance when it is applied and becomes a rubber-like substance at a later stage after curing. The RTV pillow is applied in two stages. Initially, an area centered on the optical axis is used. The RTV pillow 24 is applied on the optical axis that is at the rear of circuit board 20. That is, the RTV pillow may be approximately the same shape and size as the photosensor 22, the center portion of the rear of printed circuit board 20, and the facing surface of a springback 26. In an exemplary embodiment, the area of the RTV pillow is approximately 20% larger than photosensor 22. The RTV pillow 24 forms the pressure transmission path from springback 26 to circuit board 20 after the RTV pillow cures.

Added after the RTV pillow is the springback 26 or other flat spring that is shaped to cover the backside of the printed circuit board and to cover the RTV pillow. The springback 26 is another part of the force applying means and may be made in a cruciform shape as shown in FIGS. 1 and 5. After the springback is placed in position, screws 30 are reinserted through holes in the springback and into the four holes of circuit board 20. Temporary spacers 28 are placed between each of the four corners of the springback and the four corners of circuit board 20. Each of the spacers 28 has a hole that is large enough to receive respective screws 30. Screws 30 are inserted through the holes in springback 26, through the holes in the spacers 28, and screwed into the holes in circuit board 20. Screws 30 and spacers 28 are also part of the force applying means.

In an exemplary embodiment, two sets of spacers 28 are used in the assembly process. The first set of spacers are temporary spacers which in an exemplary embodiment may be 0.125 inch long and are longer than a second set of spacers which are used later in the assembly process. After the temporary spacers are placed between screws 30 and the springback 26, the screws 30 are tightened to securely couple springback 26 to the circuit board 20. The central portion of the springback 26 is aligned directly behind the location of the optical axis of photosensor 22 and the optical sensor line of the assembly.

In an exemplary embodiment, springback 26 may be 316 alloyed stainless steel. In an alternative embodiment, it may be beryllium-copper or any metallic high carbon spring steel or any other metallic spring material. In alternative embodiments, other kinds of springs may be used instead of springback 26. For example, wire springs, plastic springs, or any material strong enough to supply the needed forces may be used. In fact, any device may be used that puts pressure on a resilient pillow and has the needed resilience to distribute forces uniformly on its forward face and therefore mitigates point loads from the springback.

After screws 30 are tightened using the temporary spacers, the interlayer RTV pillow is allowed to reach its final, full cured state, which in an exemplary embodiment may be approximately durometer 50–60. In an alternative embodiment, a different level of hardening may be used. After the RTV pillow has reached its final cured state, the temporary spacers 28 at the four corners of the springback and the printed circuit board are removed and replaced with shorter spacers. In an exemplary embodiment, the permanent spacers may be 0.090 inch long.

Figure 6:
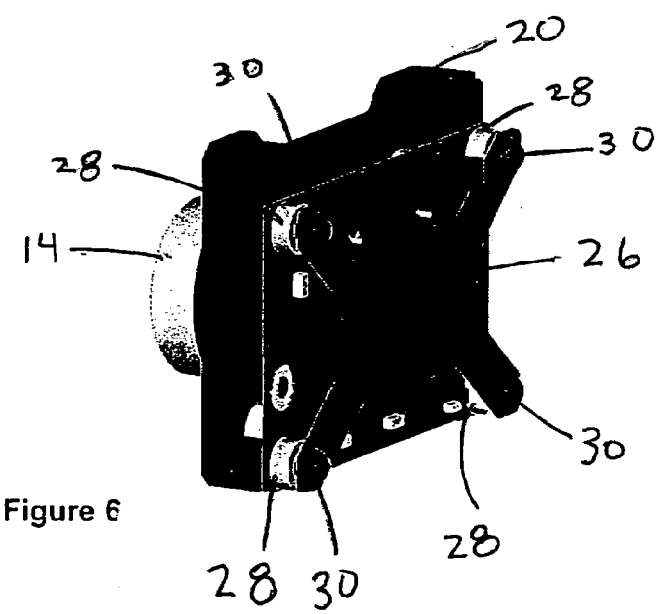
FIG. 6 is a perspective rear view of the completed assembly of the device illustrated in FIG. 1.

Before the permanent spacers are installed, additional RTV paste is added. The second RTV stage substantially fills all of the remaining springback area between the springback and the circuit board and along the length of the springback arms to the ends of the arms where the four holes are located. After the final spacers are installed, the four screws 30 are tightened. An exemplary embodiment of the final assembled device is shown in FIG. 6. The shorter spacers allow the screws to pull the arms of springback 26 closer toward circuit board 20.

When the arms of springback 26 are closer to circuit board 20, the central portion of springback 26 presses the original central pillow and compresses the optical path. After the screws have been tightened using the permanent shorter spacers, the springback is in a permanent condition of elastic displacement. The pressure supplied by the four screws is transferred through the RTV pillow to the center portion of the printed circuit board rear surface by means of the springback 26. This pressure is transferred to the front face 22A of photosenor 22 thereby placing the bond between photosensor 22 and the front face 16 of fiber optic unit 14 in a state of compression. That is, a positive pressure is created against the backside of the circuit board because the springback pushes on the RTV pillow, which pushes on the back of the circuit board which pushes on the photosenor, which pushes on the fiber optic unit. The transmission of pressure to the joint between the fiber optic unit 14 and photosensor 22 is an important goal of an exemplary embodiment of the invention. The RTV pillow added in the second stage is not part of the pressure path from the springback to the fiber optic unit. The purpose of the RTV pillow added in the second stage is to deaden the spring arms of springback 26 and circuit board 20 against resonance.

In an exemplary embodiment, approximately 10 to 11 kilograms of pressure may be applied by the springback through the RTV pillow to the joint between fiber optic unit 14 and photosensor 22. Alternative embodiments may apply different amounts of pressure. The pressure is a compression force to the joint between the fiber optic unit and photosensor. This compression force strengthens the bond between the fiber optic unit and photosensor.

The pressure is applied along the optical center line through the mechanism described. A pressure area is centered about the optical center line; that is, a line down the center of the image. The center of the fiber optic unit is bonded to the center line of the photosensor. This compression bonding is used because it is important to make sure that the optical center line of the fiber optic unit and photosenor does not move during use of the unit.

Because of the compression joint, the fiber optic unit, the photosensor and the circuit board may move substantially together as a unit when vibration is applied to the unit. The individual subunits may not move separately in different directions. The RTV pillow also lessens the effect of vibration by converting the physical vibration energy to heat energy and radiating the heat energy away from the assembly. Maintaining the position of the fiber optic unit relative to the photosensor prevents cavitation, striations, and stress induced Moire. Maintaining the position of the units relative to each other is important in maintaining optimal MTF (modulation transfer function).

Although a bonding approach has been described with respect to a particular design and set of requirements, the approach may be used with other optical systems. For example, the approach could be extended to other optical assemblies such as on a camera designed to follow free-fall aircraft delivered weapons where a robust camera must follow the bomb or missile to impact, trailing either on a tethered line or in a free-fall itself. Other field weapons that deliver warheads, machine guns, and mortars experience severe physical forces in the course of operation. Such weapons would benefit from a light intensified camera mounted to the frame of the weapon. The invention may also be used on unmanned battlefield vehicles, which are built to take extreme punishment in service. Such vehicles might carry a light amplified camera which could be built using the present invention in order to provide a sufficiently rugged optical subsystem.

In a non-military application, the system may be used on machine tools with a camera which provides visual feedback to remote operators. Some of these tools experience severe environments of high temperature extremes, shock, and vibration.

This exemplary embodiment of the invention provides an optical system which will withstand extreme environmental conditions. The device will survive extremely severe mechanical shock, vibration, and thermal environments. It is the mechanical shock that most threatens the long-term reliability of a bond between a fiber optic unit and a photosensor. In an exemplary embodiment, the device will survive a mechanical shock of 100G at a repetition rate of 30 HZ. In an alternative embodiment, the device will withstand other forces at other repetition rates. The assembly will also provide the necessary robustness against the extremes of military application such as temperature excursions between −40° C. to 75° C., repetitive shock up to 100G, and a vibration characteristic of battle field devices.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method of mounting a fiber optic unit to a photosensor, the method comprising the steps to:
   mounting the photosensor to a first carrier;
   bonding a first end of the fiber optic unit to the photosensor to create a joint between the fiber optic unit and the photosensor;
   mounting a second end of the fiber optic unit to a second carrier; and
   compressing the joint between the fiber optic unit and the photosensor to strengthen the bond between the fiber optic unit and the photosensor.

2. The method of claim 1, further comprising the step of aligning an optical axis of the fiber optic unit with an optical axis of the photosensor.

3. The method of claim 2, further comprising the step of applying a pressure along the optical axis of the fiber optic unit.

4. The method of claim 2, further comprising the step of applying a pressure along the optical axis of the photosensor.

5. The method of claim 2, further comprising the step of applying a flexible backing along the optical axis of the photosensor.

6. The method of claim 5, further comprising the step of applying a pressure to the flexible backing.

7. The method of claim 5, further comprising the step of compressing the flexible backing.

8. The method of claim 5, further comprising the step of applying at least one compression force to the flexible backing.

9. The method of claim 1, further comprising the step of applying a pressure to a side of the first carrier.

10. A device for mounting a fiber optic unit to a photosensor, the device comprising:
   a photosensor mounted to a first carrier;
   a fiber optic unit coupled to the photosensor to create a joint between the photosensor and the fiber optic unit; and
   a force applying means coupled to the photosensor and the fiber optic unit for applying a compression force to the joint substartially in an axial direction of the fiber optic unit.

11. The device of claim 10, wherein the force applying means includes a second carrier mounted to the fiber optic unit.

12. The device of claim 10, wherein the force applying means includes a flexible backing coupled to the first carrier.

13. The device of claim 12, wherein the flexible backing is formed from a paste material.

14. The device of claim 10, wherein the force applying means includes a spring.

15. The device of claim 14, wherein the spring presses the flexible backing against the first carrier.

16. A device for mounting a fiber optic unit to a photosensor, the device comprising:
   a photosensor mounted to a carrier;
   a fiber optic unit bonded to the photosensor at a joint between the photosensor and the fiber optic unit; and
   a force applying apparatus coupled to the photosensor and the fiber optic unit for applying a compression force to the joint substantially in an axial direction of the fiber optic unit.

17. The device for mounting of claim 16, wherein the force applying apparatus includes a spring and a flexible layer between the spring and the photosensor.

18. A method of mounting a fiber optic unit to a photosensor, the method comprising the steps of:
   mounting the photosensor to a carrier;
   bonding a first end of the fiber optic unit to the photosensor at a joint between the fiber optic unit and the photosensor; and
   compressing the joint between the fiber optic unit and the photosensor substantially in an axial direction of the fiber optic unit.

19. The method of mounting of claim 18, further comprising the steps of aligning an optical axis of the fiber optic unit with an optical axis of the photosensor and applying pressure along at least one of the optical axis of the fiber optic unit and the optical axis of the photosensor.

* * * * *